UNITED STATES PATENT OFFICE.

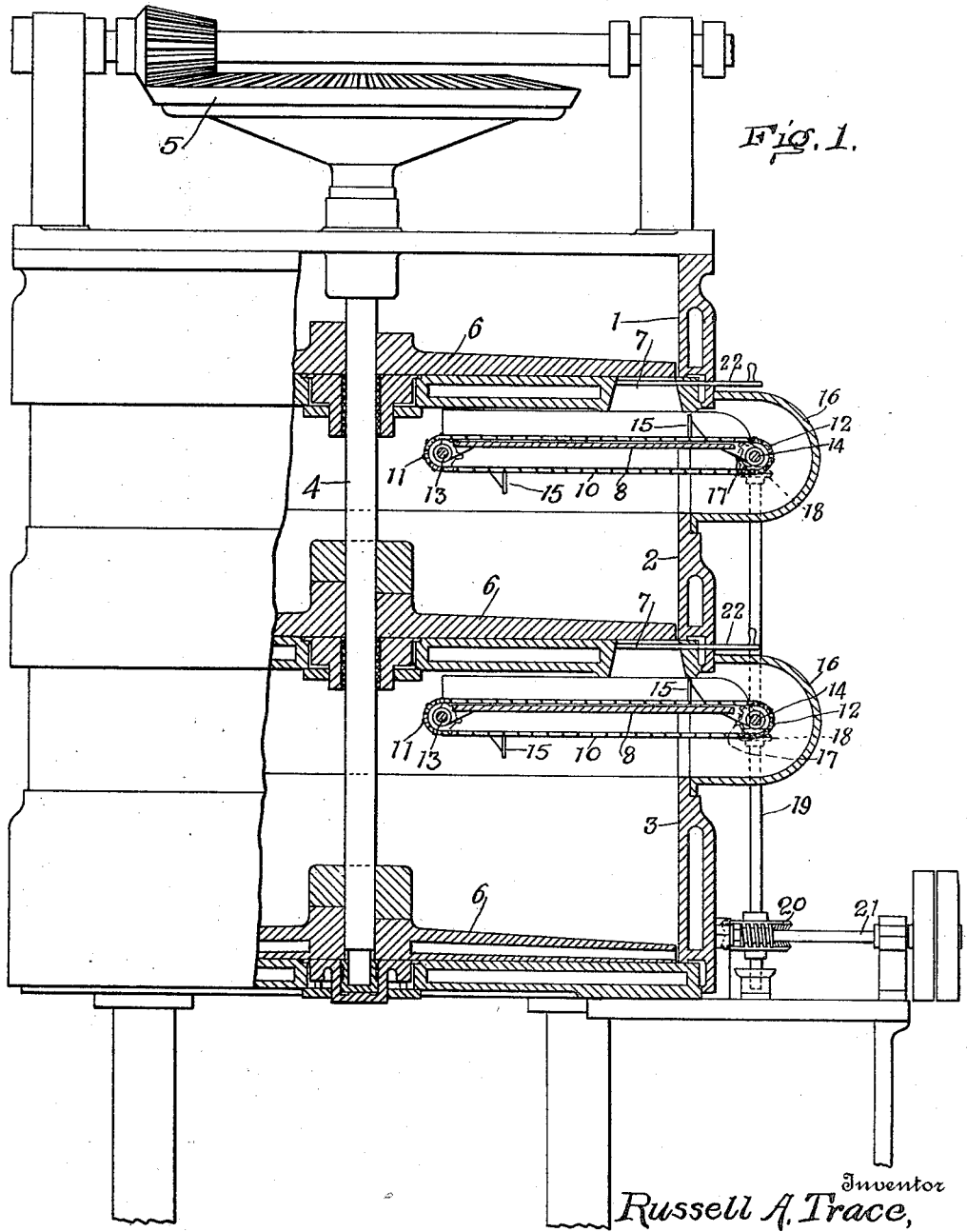

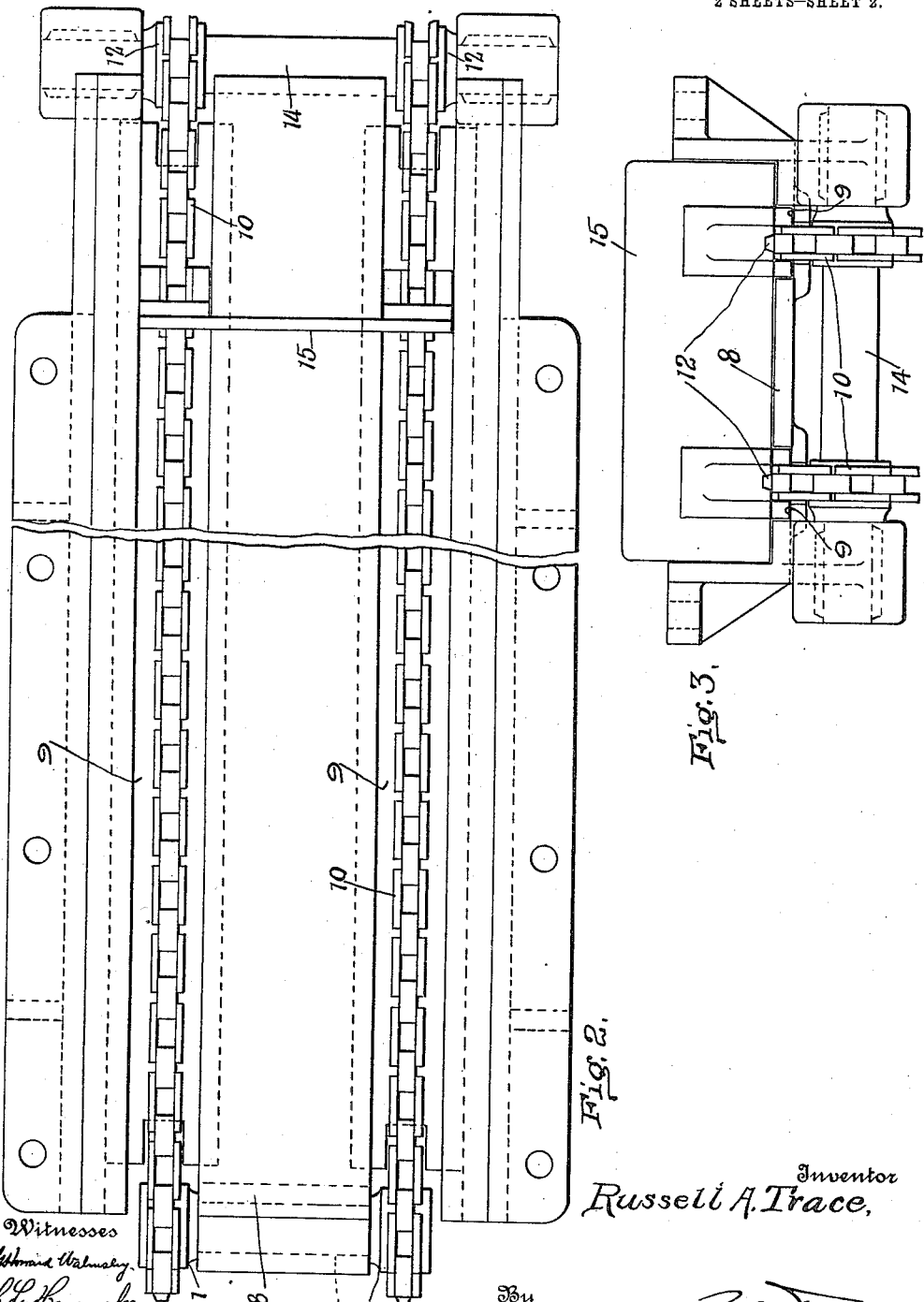

RUSSELL A. TRACE, OF DAYTON, OHIO, ASSIGNOR TO BUCKEYE IRON AND BRASS WORKS, OF DAYTON, OHIO, A CORPORATION OF OHIO.

COOKER.

1,106,597.  Specification of Letters Patent.  Patented Aug. 11, 1914.

Application filed March 19, 1914. Serial No. 825,790.

*To all whom it may concern:*

Be it known that I, RUSSELL A. TRACE, a citizen of the United States, residing at Dayton, in the county of Montgomery and State of Ohio, have invented certain new and useful Improvements in Cookers, of which the following is a specification, reference being had therein to the accompanying drawing.

This invention relates to cookers such as are commonly employed for preparing seeds, meal and the like for treatment to press the oil therefrom. These cookers usually comprise a series of receptacles or kettles arranged one above the other, each upper kettle discharging into the kettle next below and the lowermost kettle discharging into a cake former where the cooked meal is formed into a cake suitable for pressing.

The object of the invention is to provide in a cooker of this kind mechanism whereby the discharge openings of the several upper receptacles may be normally open and the meal which is discharged therefrom will be delivered at suitable times to the respective lower cookers at points remote from the discharge opening of the upper cooker.

It is also an object of the invention to provide in a cooker of this kind a conveyer arranged to receive the material from the discharge opening of one of the upper cookers and deliver the same intermittently to the center of the next lower cooker.

In the accompanying drawings, Figure 1 is an elevation, partly in section, of a cooker embodying my invention; Fig. 2 is a plan view of the conveyer; and Fig. 3 is an end elevation of the same.

In these drawings I have illustrated one embodiment of my invention in which I have shown the same as applied to a three-high cooker in which the kettles are arranged one above the other in vertical alinement. It will be understood, however, that this particular size and type of cooker is chosen for the purposes of illustration only. As here shown, the three kettles are indicated by the reference numerals 1, 2 and 3, respectively, numbering from the top down. Extending vertically through the several cookers is a shaft 4 which is positively driven through gearing 5 from a suitable source of power. Mounted within each kettle and secured to the shaft is a sweep 6, arranged close to the bottom of the kettle and adapted to distribute the meal or seeds therein and agitate the same to facilitate the cooking operation. It will be understood that the cooking is accomplished by means of steam which is circulated through the hollow walls and bottoms of the kettles. Each of the upper kettles 1 and 2 has a discharge opening 7 arranged near the outer edge thereof and discharging into the kettle next below it. These discharge openings are arranged near the outer walls of the respective kettles and the sweeps as they revolve in the kettles gradually work the meal outward to the openings. Mounted in each of the kettles 2 and 3 are conveyers arranged to receive the material as it is discharged through the respective openings 7 and deliver the same at intervals to the kettles in which the conveyers are respectively mounted. As here shown each conveyer comprises a fixed portion or table 8 extending beneath the respective discharge opening and having on opposite sides of its longitudinal center grooves or channels 9 in which travel conveyer chains 10. The conveyer chains pass about sprocket wheels 11 and 12 mounted on shafts 13 and 14 journaled in suitable bearings at the opposite ends of the table 8. The chains of each conveyer are provided with one or more flights or wide cleats 15. Where a plurality of these flights are employed they are spaced apart predetermined distances to enable the feed of the material to be controlled as desired.

The conveyers may be driven in any suitable manner. In the present instance I have shown the cookers as provided with housings 16 secured to and projecting beyond the side walls thereof in positions to receive the ends of the respective conveyers, as shown in Fig. 1. The shafts 14 project beyond the walls of the respective housings and are provided with bevel gears 17 which mesh with corresponding gears 18 on a vertical shaft 19 which is positively driven from a suitable source of power, such as worm gearing 20 on a power shaft 21.

The conveyers are driven at a slow speed which is, of course, timed according to the requirements of the particular cooker and the openings may be allowed to remain open, normally. Under these conditions the meal in the upper cooker will be discharged through the opening 7 into the conveyer next below that opening where it will lie until one of the flights 15 engages the same and moves it to the discharge end of the conveyer which is preferably so arranged as to deliver the meal at a point near the center of the lower kettle where it will be engaged by the sweep, distributed in the kettle, moved toward the outer wall thereof and again discharged through the opening 7 of that kettle. The number of flights and the speed of the conveyer may be so regulated as to permit the entire contents of the upper kettle to be discharged on to the conveyer and delivered at one time to the next lower kettle or less quantities of the material may be delivered to the lower conveyer, it being understood that the delivery, while being intermittent, does not necessarily handle a complete charge upon each delivery. In this manner the meal is delivered intermittently and at predetermined intervals to the lower cookers, the length of the intervals being determined by the distance between the flights on the conveyer and the speed at which the conveyer is operated. Further, it will be understood that if desired gates of any suitable kind may be employed in connection with the conveyer but, in the present instance, the only gates employed are those indicated at 22, which are hand operated gates to enable the openings to be closed in cases of emergency.

While I have shown and described one embodiment of my invention it will be understood that this has been chosen for the purposes of illustration only, and that I do not desire to be limited to the details of construction shown and described, for obvious modifications will occur to a person skilled in the art.

Having thus fully described my invention, what I claim as new and desire to secure by Letters Patent, is:—

1. The combination, with a series of kettles arranged one above the other, each of the kettles except the bottom one having a discharge opening delivering into the kettle next below it, and a conveyer mounted in each of the lower kettles to receive the material from the respective discharge openings and deliver the same at predetermined intervals to said lower kettle.

2. The combination, with an upper kettle and a lower kettle, the upper kettle having a discharge opening arranged near the outer wall thereof and leading to said lower kettle, a conveyer mounted in said lower kettle to receive the material from said discharge opening and deliver the same at predetermined intervals to a point near the center of said lower kettle.

3. The combination, with an upper kettle and a lower kettle, the upper kettle having a discharge opening leading to the lower kettle, of a conveyer comprising a fixed part arranged to receive the material from said discharge opening, and a movable part arranged to engage the material on said fixed part at intervals and deliver the same to said lower kettle.

4. The combination, with an upper kettle and a lower kettle, said upper kettle having a discharge opening leading to the lower kettle, of an endless belt conveyer arranged beneath said discharge opening and comprising a fixed table to receive the material from said discharge opening and having channels, endless chains arranged to travel in said channels and one or more flights carried by said endless chains adapted to engage the material on said table and move the same to the discharge end thereof.

5. In a cooker, the combination, with upper and lower kettles, said upper kettle having a normally open discharge opening leading to the lower kettle, of a device to receive the material from said discharge opening and deliver the same at predetermined intervals to said lower kettle.

6. In a cooker, the combination, with a plurality of kettles arranged one above the other, each upper kettle having a discharge opening leading to the lower kettle, a housing mounted on one side of each of the lowermost kettles and communicating with the interior thereof, a conveyer mounted in each of said lower kettles and having one end extending into said housing, a shaft mounted in each of said housings to drive the respective conveyers, and a vertical shaft arranged on the outside of said housing and connected with the first-mentioned shaft to impart movement thereto.

In testimony whereof, I affix my signature in presence of two witnesses.

RUSSELL A. TRACE.

Witnesses:
F. W. SCHAEFER,
EDWARD S. REED.

---

Copies of this patent may be obtained for five cents each, by addressing the "Commissioner of Patents, Washington, D. C."